UNITED STATES PATENT OFFICE.

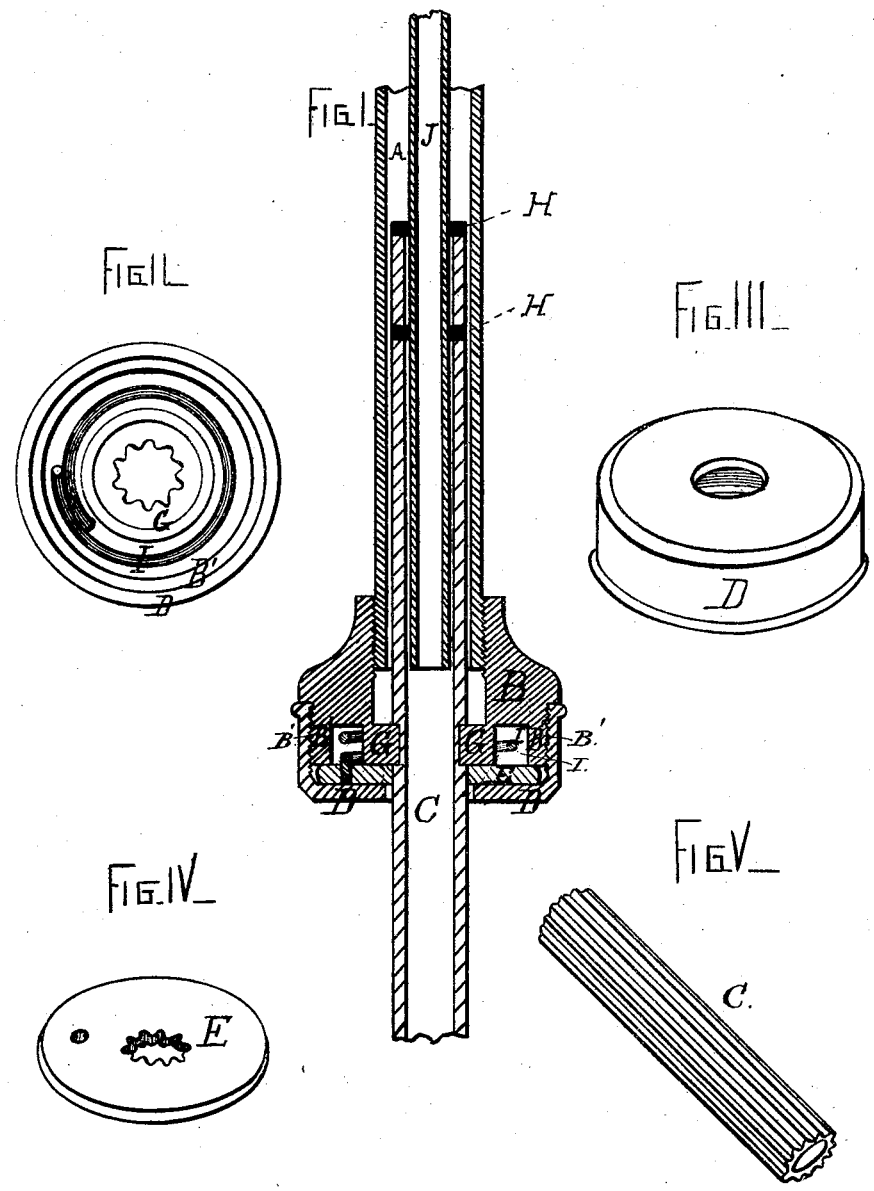

ROBERT CORNELIUS, OF PHILADELPHIA, PENNSYLVANIA.

IMPROVEMENT IN DROP-LIGHTS FOR CHANDELIERS.

Specification forming part of Letters Patent No. 140,347, dated July 1, 1873; application filed March 11, 1873.

*To all whom it may concern:*

Be it known that I, ROBERT CORNELIUS, of the city and county of Philadelphia, in the State of Pennsylvania, have invented a new and useful Improvement in Drop-Lights for Chandeliers; and I do hereby declare the following to be a full, clear, and exact description thereof, which will enable others skilled in the art to which it appertains to make and use the same, reference being had to the accompanying drawing, which forms a part of this specification, and in which—

Figure 1 is a longitudinal section of my improvement through the center. Fig. 2 is a bottom view of the spring-box B with the cap D, the pipe C, and the plate E removed. Fig. 3 is a perspective view of the cap D. Fig. 4 is a perspective view of the plate E, showing the corrugations through which the pipe C slides; and Fig. 5 is a perspective view of a section of the corrugated pipe C.

The same letters refer to the same parts in all the figures.

My invention has for its object the ready lengthening and shortening of the drop-lights for chandeliers, or of the chandeliers themselves.

There are several methods at present in vogue for this purpose. Many of these are contrivances employing unsightly and cumbersome arrangements of weights, ropes, pulleys, chains, and the like. Then there are others depending solely upon the continued friction of impinging surfaces, which, in constant use, are certain to wear out quickly and require continual attention and adjustment. Now, while I purpose in my invention to use the principle of binding friction to maintain the fixture in place at rest, I yet purpose to relieve it in a great measure when sliding the fixture up and down.

A, in Fig 1, represents the main pipe of a chandelier. B represents a spring-box, which may be concealed in any ornament upon the main pipe of a chandelier; or may be fashioned so as to form an ornament itself. C represents an inclosed pipe concentric with A, and so arranged as to slide up and down inside A in a manner hereinafter described. Attached to the lower extremity of the pipe C is a drop-light fixture, of any kind or description. Centrally inclosed and formed within the spring-box B is a collar, G, of any suitable material, whose interior circumference is provided with corrugations, or fashioned in any shape to correspond with the exterior contour of the pipe C, whatever the shape of that pipe may be, which slides within it. The collar is sufficiently loose to allow a certain amount of play laterally to the pipe C. Said pipe C is an ordinary metal gas-pipe of a regular corrugated section, as indicated in Fig. 5; or it may be made of any irregular, polygonal, or non-circular section. An oval section I consider the best, for reasons hereinafter to be set forth, and in case that form is used a play in the collar of even as much as a quarter of a diameter is advisable. At its upper extremity it is provided with a packing of leather, H, to fit it gas-tight upon a central supply-pipe, J, and to its lower extremity is attached any description of gas-fixture desired. Inclosed within the annular space formed in the spring-box, between the inner circumference of its outer wall B' and the outer circumference of the collar G, is a spiral-spring, I, (rigidly attached at one extremity to the base of the annular space, in which it is inclosed, and at the other to a circular plate or disk, E, hereinafter to be described,) whose function will be hereinafter mentioned. Inclosed within the spring-box B, and lying directly over the cap D, is a circular plate or disk, E, of metal, or other suitable material, fitted around the sliding-pipe C in the same manner as is the collar G, and of a section corresponding to the exterior contour of the sliding pipe, a certain amount of lateral play being here, too, allowed. Screwing on the lower end of the spring-box B, and covering and concealing the whole internal contrivance hereinbefore described, is a cap, D, of any suitable material, shown in perspective in Fig. 3, in whose head or crown is cut a circular aperture of a diameter sufficient to admit of the unimpeded passage of the sliding pipe C.

The whole spring-box contrivance may be placed for convenience below the distributers of the chandelier, when used to control a drop-light, or it may be located above them, if desired.

The combined arrangement of my contrivance is as follows: The pipe C is slid through the collar G and on the central supply-pipe J. The disk E is then slid on over the pipe, and made fast to one end of the spiral spring I in any manner most convenient. The cap D is then slipped over the pipe and screwed down. The result of this arrangement is to have a sliding pipe, C, of corrugated or other contour, passing through the collar G, and the disk E of corresponding section passing up through the surrounding pipe A, and fitted gas-tight around a central supply-pipe, J, by means of a packing, H. A free passage for the ingress of gas flowing down from the pipe J into the pipe C is thus secured. The disk E is free to rotate to a certain extent, as controlled by the spring I and the pipe C.

The action of the contrivance is as follows: The corresponding corrugations on the interior circumferences of the collar G and the disk E are held so as to coincide, the spring I attached to the disk E being compressed in so doing, by rotating the disk to the right, say a half-turn, before the sliding pipe C is slipped through the corrugations in the disk E and the collar G. The spring, resisting the compression, expands and rotates the disk E to the left as far as the play in the corrugations will permit, and the result is that the sliding pipe C is bound firmly in place by the power of the spring.

When it is desired to alter the height of the drop-light all that is necessary is to grasp the fixture firmly, rotate it slightly to the right, and hold it there. The result is to rotate the disk E, compress the spring I, and relieve the binding action between the collar, sliding-pipe, and disk, when it becomes easy to elevate or depress the fixture the only resistance to be overcome being that of the friction of the corrugations in the pipe against those in the disk, which results from the expanding force of the spring. When a pipe of oval section is used, passing through a collar and disk of similar section, the result is to wedge the pipe when rotated, and hold it very firmly in position.

What I claim as my invention, and desire to secure by Letters Patent of the United States, is—

The combination, in a chandelier, of the sliding pipe C, the spring I, the friction collar G, and disk E, arranged, combined, and operated substantially as hereinbefore set forth.

ROBERT CORNELIUS.

Witnesses:
 WM. P. HIBBARD,
 J. BONSALL TAYLOR.